(12) United States Patent
He et al.

(10) Patent No.: US 11,543,305 B2
(45) Date of Patent: Jan. 3, 2023

(54) METHOD FOR ESTIMATING JUNCTION TEMPERATURE ONLINE ON IGBT POWER MODULE

(71) Applicant: WUHAN UNIVERSITY, Hubei (CN)

(72) Inventors: Yigang He, Hubei (CN); Kaiwei Li, Hubei (CN); Weibo Yuan, Hubei (CN); Liulu He, Hubei (CN); Yuzheng Guo, Hubei (CN); Hui Zhang, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 410 days.

(21) Appl. No.: 16/689,111

(22) Filed: Nov. 20, 2019

(65) Prior Publication Data
US 2020/0240850 A1 Jul. 30, 2020

(30) Foreign Application Priority Data

Jan. 24, 2019 (CN) .......................... 201910069446.2

(51) Int. Cl.
G06F 17/10 (2006.01)
G06F 17/15 (2006.01)
(Continued)

(52) U.S. Cl.
CPC ............ *G01K 13/00* (2013.01); *G01K 7/015* (2013.01); *G06F 17/10* (2013.01); *G06F 17/15* (2013.01)

(58) Field of Classification Search
CPC ...... G01K 13/00; G01K 2217/00; G01K 7/01; G01K 7/015; G01K 7/42; G06F 17/10; G06F 17/15
See application file for complete search history.

(56) References Cited

FOREIGN PATENT DOCUMENTS

CN 107192934 9/2017
CN 107219016 A * 9/2017 ............... G01K 7/22
(Continued)

OTHER PUBLICATIONS

Chen et al., "Predicting IGBT Junction Temperature with Thermal Network Component Model", 2011 Asia-Pacific Power and Energy Engineering Conference, Mar. 25-28, 2011 (Year: 2011).*

(Continued)

*Primary Examiner* — Regis J Betsch
(74) *Attorney, Agent, or Firm* — JCIPRNET

(57) ABSTRACT

A method for estimating the junction temperature on-line on an insulated gate bipolar transistor (IGBT) power module, including the following steps. Estimate the junction temperature by the temperature sensitive electrical parameter method, set the space thermal model of the extended state, and apply the Kalman filter to the junction temperature estimation. The temperature sensitive electrical parameter method estimates the junction temperature of the IGBT power module in real time, selects the IGBT conduction voltage drop $V_{CE(ON)}$ as the temperature sensitive electrical parameter, and provides a $V_{CE(ON)}$ on-line measuring circuit. The power loss of the diode and IGBT and the estimated value of junction temperature obtained by the temperature sensitive electrical parameter method are taken as the input of the Kalman filter, and measurement noise and process noise are considered to obtain an optimal estimated value of junction temperature.

6 Claims, 8 Drawing Sheets

(51) Int. Cl.
    *G01K 13/00*     (2021.01)
    *G01K 7/01*     (2006.01)

(56) References Cited

FOREIGN PATENT DOCUMENTS

| | | |
|---|---|---|
| CN | 108108573 | 6/2018 |
| KR | 20170104735 A * | 9/2017 |

OTHER PUBLICATIONS

Wu et al., "Junction Temperature Prediction of IGBT Power Module Based on BP Neural Network", Electr Eng Technol vol. 9, No. 3: 970-977, 2014 (Year: 2014).*

* cited by examiner

METHOD FOR ESTIMATING JUNCTION TEMPERATURE ONLINE ON IGBT POWER MODULE

CROSS-REFERENCE TO RELATED APPLICATION

This application claims the priority benefit of China application serial no. 201910069446.2, filed on Jan. 24, 2019. The entirety of the above-mentioned patent application is hereby incorporated by reference herein and made a part of this specification.

BACKGROUND

Technical Field

The invention belongs to the field of power electronics and electronic information science, and particularly relates to a method for estimating the junction temperature on-line on an IGBT power module, and uses the Kalman filter to obtain an optimal estimation value of the junction temperature.

Description of Related Art

Power converters are widely used in the fields related to smart grids, rail transit and new energy sources. Insulated gate bipolar transistors (IGBT) are the key components of power converter devices, and their reliability is the guarantee for safe operation of the system. Therefore, monitoring the condition and predicting the service life of IGBT is extremely important. There are many types of IGBT power module failure modes, and temperature is the main factor causing its failure. Therefore, thermal analysis is an important part of IGBT power module status evaluation. Real time measurement of the junction temperature of IGBT power module is of great significance for improving the reliability of the system.

Patent application number 201810036617.7 (publication number 108108573A) discloses a method for dynamically predicting the junction temperature of an IGBT power module. It calculates the junction temperature based on the method of a fixed thermal model, but cannot compensate for degradation of thermal path caused by the influence of aging and cooling conditions. Patent application number 201710334867.4 (publication number 107192934A) discloses a measurement method for the transient thermal impedance of the crust of a high-power IGBT, which uses the temperature sensitive electrical parameter method to measure the temperature drop curve of the junction temperature of the high-power IGBT during the cooling process, and also uses the thermocouple method to obtain the temperature drop curve of the IGBT shell temperature. However, the measurement error and the change of the operation conditions affect the estimated value, and failure rate of the thermocouple is high and the maintenance is difficult.

SUMMARY

The technical problem to be solved by the present invention is to provide a method for estimating the junction temperature on-line on an IGBT power module to fix the above-mentioned deficiencies of the related art, and realizing electrical insulation without changing the control strategy of the power converter for measurement. The method of the present invention reduces noise and eliminates the intermittent effects of voltage measurements, and improves the accuracy of junction temperature measurements.

The technical solution adopted by the present invention to solve the above technical problems is:

A method for estimating junction temperature on-line on an IGBT power module includes the following steps:

Step 1: setting a full-bridge inverter circuit and a $V_{CE(ON)}$ on-line measuring circuit based on a power electronic simulation software Saber, connecting two input terminals of the $V_{CE(ON)}$ on-line measuring circuit to the collector and emitter of an IGBT of the full-bridge inverter circuit, thereby realizing the connection between the full-bridge inverter circuit and the $V_{CE(ON)}$ on-line measuring circuit;

Step 2: obtaining IGBT conduction voltage drop $V_{CE(ON)}$ for the connected full-bridge inverter circuit and the $V_{CE(ON)}$ on-line measuring circuit, using the temperature sensitive electrical parameter method to obtain the calibration curve and fitting relationship of IGBT conduction voltage drop $V_{CE(ON)}$ and an IGBT power module junction temperature $T_j$;

Step 3: based on the full-bridge inverter circuit set in step 1, setting the behavior model of the IGBT power module composed of an IGBT and a corresponding diode, wherein static and dynamic characteristics of the behavior model are simulated and analyzed to calculate the switching loss and conduction loss of the IGBT, reverse recovery loss and conduction loss of the diode;

Step 4: considering the coupling effect between the IGBT and the diode in the IGBT power module of step 3, and setting a thermal model of extended state space of the IGBT power module;

Step 5: setting a system model of the Kalman filter (i.e., the Kalman filter), the IGBT power module junction temperature obtained in the step 2, the switching loss and conduction loss of the IGBT obtained in the step 3, the reverse recovery loss and conduction loss of the diode obtained in the step 3 are used as filter inputs to calculate the optimal estimated value of junction temperature.

According to the above scheme, the specific method for setting the full-bridge inverter circuit in the step 1 comprises: firstly setting the sinusoidal pulse width modulation (SPWM) control circuit, setting the dead-zone time, and then setting the gate driving circuit, and the gate driving circuit is modulated by the SPWM control circuit, the input terminal of the gate driving circuit is connected to the output terminal of the SPWM control circuit, and the output terminal of the gate driving circuit is connected to the gate of the IGBT of the IGBT power module. The full-bridge inverter circuit has four bridge arms, each of the bridge arms is composed of an SPWM control circuit, a gate driving circuit, an IGBT and a diode. Then the $V_{CE(ON)}$ on-line measuring circuit is set, and finally the two input terminals of the $V_{CE(ON)}$ on-line measuring circuit are connected to the collector and emitter of the IGBT of one of the bridge arms of the full-bridge inverter circuit.

According to the above scheme, the specific method for monitoring the junction temperature on-line by the temperature sensitive electrical parameter method is as follows. First, the IGBT is placed in the incubator, and after the junction temperature of the IGBT power module is stabilized, the small current $I_C$ at 100 mA-1 A is injected into the collector of the IGBT; then the saturation conduction voltage drop $V_{CE(ON)}$ of IGBT is measured, the temperature of the incubator is changed, and the saturation conduction voltage drop $V_{CE(ON)}$ of the IGBT is repeatedly measured in the range of 20° C.-150° C., and finally the junction temperature $T_j$ is taken as the dependent variable, and $V_{CE(ON)}$ is an independent variable, and the $V_{CE(ON)}$ is linearly fitted to obtain a fitting relationship $T_j=f(V_{CE(ON)})$.

According to the above scheme, the switching loss and conduction loss of the IGBT, the reverse recovery loss and the conduction loss of the diode obtained through the calculation in the step 3 are specifically as follows.

The IGBT Level-1 Tool modeling toolbox in Saber is used to set the simulation model for the specific structure and process of the device, thereby accurately representing the static and dynamic characteristics of the device, simulating the dynamic switching process of the IGBT power module, and obtaining the voltage and current waveform of the IGBT when the IGBT is on and off, and reverse recovery voltage and current waveform of diode, and voltage and current waveforms when IGBT and diode are turned on.

The loss of the IGBT is calculated as follows:

$$P_{on} = \frac{1}{t_{on}} \int_0^{t_{on}} v_{ce}(t) i_c(t) dt$$

$$P_{off} = \frac{1}{t_{off}} \int_0^{t_{off}} v_{ce}(t) i_c(t) dt$$

$$P_{cond\_I} = V_{ce(on)} \times I_C \times \delta_I$$

$$P_{IGBT} = P_{on} + P_{off} + P_{cond}$$

In the above equations, $P_{on}$ represents the turn-on loss of the IGBT; $t_{on}$ represents the turn-on time of the IGBT; $v_{ce}(t)$ represents the collector-emitter voltage of the IGBT during turn-on; $i_c(t)$ represents the collector current of the IGBT during turn-on; $P_{off}$ represents the IGBT turn-off loss; $t_{off}$ indicates the turn-off time of the IGBT; $P_{cond\_I}$ indicates the conduction loss of the IGBT; $V_{ce(on)}$ indicates the conduction voltage drop of the IGBT; $I_C$ indicates the conduction current of the IGBT; and $\delta_1$ indicates the duty ratio of the current operating state of the IGBT; $P_{IGBT}$ represents the total loss of the IGBT; t represents time.

The loss of the diode is calculated as follows:

$$P_{cond\_D} = V_F \times I_F \times \delta_D$$

$$P_{rec} = \frac{1}{t_{rr}} \int_0^{t_{rr}} v_f(t) i_f(t) dt$$

$$P_{DIODE} = P_{cond\_D} + P_{rev}$$

In the above equations, $P_{cond\_D}$ represents the conduction loss of the diode; $V_F$ represents the conduction voltage drop of the diode; $I_F$ represents the conduction current of the diode; $\delta_D$ represents the duty ratio of the current operating state of the diode; $P_{res}$ represents the reverse recovery loss of the diode; t represents the reverse recovery time of the diode; $v_f(t)$ represents the voltage of the diode in reverse recovery; and $i_f(t)$ represents the current when the diode is in reverse recovery; t represents time.

According to the above scheme, the specific method for setting the space thermal model of extended state of the IGBT power module in the step 4 is the following.

First, the self-heating of the IGBT is simulated, and its thermal resistance is expressed by the following equation:

$$Z_{\theta ja}(t)=(T_j(t)-T_a)/P_{IGBT}$$

In the above equation, $T_j(t)$ represents the IGBT junction temperature; $T_a$ represents the ambient temperature at which the IGBT power module is located; $Z_{\theta ja}(t)$ represents the thermal resistance; $P_{IGBT}$ represents the total loss of the IGBT; t represents time.

The above equation is expressed by the equivalent RC network, which is replaced by the Foster thermal network model, which is an RC loop composed of N thermal resistances and N thermal capacitances connected in parallel. The time response is expressed by the following series of exponential items:

$$Z_{\theta ja}(t)=\Sigma_{i=1}^n R_i(1-e^{-t/R_i C_i})$$

The Laplace transform is performed on the above equation, and the thermal resistance in the frequency domain is expressed as a partial fractional form:

$$Z_{\theta ja}(s) = \frac{k_1}{s+p_1} + \frac{k_2}{s+p_2} + \ldots + \frac{k_n}{s+p_n}$$

In the above two equations, i represents the network order of the Foster thermal network model; n represents the total network order of the Foster thermal network model; $R_i$ represents the thermal resistance in the Foster thermal network model; $C_i$ represents the thermal capacitances in the Foster thermal network model; $k_i=1/C_i$; $k_n=1/C_n$; $p_i=1/R_i C_i$, $p_n=1/R_n C_n$.

The state space expression for the partial fraction of the above partial fractional form is:

$$\dot{x}(t)=Ax(t)+Bu(t) \quad \text{(equation of state)}$$

$$T_j(t)=Cx(t)+Du(t) \quad \text{(output equation)}$$

$$A = \begin{bmatrix} \frac{1}{R_1 C_1} & 0 & 0 & \ldots & 0 \\ 0 & \frac{1}{R_2 C_2} & 0 & \ldots & 0 \\ 0 & 0 & \frac{1}{R_3 C_3} & \ldots & 0 \\ \vdots & \vdots & \vdots & \ddots & \vdots \\ 0 & 0 & 0 & \ldots & \frac{1}{R_n C_n} \end{bmatrix},$$

$$b = \begin{bmatrix} \frac{1}{C_1} & 0 \\ \frac{1}{C_2} & 0 \\ \frac{1}{C_3} & 0 \\ \vdots & \vdots \\ \frac{1}{C_n} & 0 \end{bmatrix}$$

$$C = [1 \; 1 \; 1 \; \ldots \; 1], D = [0 \; 1]$$

Specifically, x(t) represents an n-dimensional state vector; $A_{n \times n}$ represents a system matrix of n rows and n columns, a diagonal matrix of which the main diagonal is $p_i$; $B_{n \times 2}$ represents an input matrix of n rows and 2 columns with the first column is $k_i$; $C_{1 \times n}$ represents the output matrix of 1 row and n columns; $D_{1 \times 2}$ represents the feedforward matrix of 1 row and 2 columns. In addition, $$u(t) = \begin{bmatrix} P_D(t) \\ T_a \end{bmatrix}$$

represents the system input vector, wherein $P_D(t)$ represents power loss of the IGBT power module.

Considering the coupling effect of the diode, and the above state space model is extended (n-order means self-heating, extended m-order means coupling heat of diode) as follows:

$$\begin{bmatrix} \dot{x}_{s1} \\ \vdots \\ \dot{x}_{sn} \\ \dot{x}_{c1} \\ \vdots \\ \dot{x}_{cn} \end{bmatrix} = \begin{bmatrix} p_{s1} & 0 & 0 & 0 & \cdots & 0 \\ 0 & \ddots & 0 & \vdots & \cdots & 0 \\ \vdots & 0 & p_{sn} & 0 & \vdots & 0 \\ 0 & \vdots & 0 & p_{c1} & 0 & \vdots \\ 0 & \cdots & \vdots & 0 & \ddots & 0 \\ 0 & \cdots & 0 & 0 & \cdots & p_{cn} \end{bmatrix} \begin{bmatrix} x_{s1} \\ \vdots \\ x_{sn} \\ x_{c1} \\ \vdots \\ x_{cn} \end{bmatrix} + \begin{bmatrix} k_{s1} & 0 & 0 \\ \vdots & \vdots & \vdots \\ k_{sn} & 0 & 0 \\ 0 & k_{c1} & 0 \\ \vdots & \vdots & \vdots \\ 0 & k_{cn} & 0 \end{bmatrix} \begin{bmatrix} P_{IGBT} \\ P_{DIODE} \\ T_a \end{bmatrix}$$

$$T_j = \begin{bmatrix} 1 & 1 & 1 & \cdots & 1 \end{bmatrix} \begin{bmatrix} x_{s1} \\ \vdots \\ x_{sn} \\ x_{c1} \\ \vdots \\ x_{cn} \end{bmatrix} + \begin{bmatrix} 0 & 0 & 1 \end{bmatrix} \begin{bmatrix} P_{IGBT} \\ P_{DIODE} \\ T_a \end{bmatrix}$$

Specifically, $x_{s1}, \ldots, x_{sn}$ represents the state of self-heating impedance, $x_{c1}, \ldots, x_{cn}$ represents the state of the coupling thermal impedance; $P_{IGBT}$ represents the power loss of the IGBT in the IGBT power module, $P_{DIODE}$ represents the power loss of the diode in the IGBT power module;

$$p_{s1} = \frac{1}{R_{s1}C_{s1}}, p_{sn} = \frac{1}{R_{sn}C_{sn}};$$

$$p_{c1} = \frac{1}{R_{c1}C_{c1}}, p_{sn} = \frac{1}{R_{sn}C_{sn}};$$

$$k_{s1} = \frac{1}{C_{s1}}, k_{sn} = \frac{1}{C_{sn}};$$

$$k_{c1} = \frac{1}{C_{c1}}, k_{cn} = \frac{1}{C_{cn}};$$

specifically, $R_{s1} \ldots R_{sn}$, $C_{s1} \ldots C_{sn}$ represent the thermal resistance thermal capacitances in the equivalent Foster thermal network model of the IGBT in the IGBT power module; $R_{c1} \ldots R_{cn}$, $C_{c1} \ldots C_{cn}$ represent the thermal resistance thermal capacitances in the equivalent Foster thermal network model of the diode in the IGBT power module.

According to the above scheme, the specific method for setting the system model of the Kalman filter in the step 5 comprises the following.

A system of a discrete control process is introduced based on a space thermal model of the extended state as follows:

$$x_k = Fx_{k-1} + Gu_k + w_k$$

$$T_k = Hx_k + Ju_k + v_k$$

In the above equation, k represents the time step; $x_{k-1}$ represents the state variable, i.e., the thermal resistance of the IGBT power module, at time (k−1); $x_k$ represents the state variable, i.e., the thermal resistance of the IGBT power module, at time k; F and G respectively represent the system matrix and control matrix; $u_k$ represents the system input vector, including the IGBT power module loss and the ambient temperature of the IGBT power module; $w_k$ and $v_k$ respectively represent the process noise and measurement noise. Assuming that both are Gaussian white noise, the covariance of process noise $w_k$ and measurement noise $v_k$ are Q and R respectively; $T_k$ represents the junction temperature observation value of IGBT power module at time k; H and J respectively represent the observation matrix and direct matrix.

The Kalman filtering algorithm flow is described as follows.

(1) Predict the thermal resistance value $\hat{x}_{(k|k-1)}$ of IGBT power module at time k from the optimal thermal resistance estimated value $\hat{x}_{(k-1|k-1)}$ of the IGBT power module at time (k−1):

$$\hat{x}_{(k|k-1)} = F\hat{x}_{(k-1|k-1)} + Gu_k$$

(2) Calculate the predicted value of the junction temperature of the IGBT power module at time k:

$$\hat{T}_{(k|k-1)} = H\hat{x}_{(k|k-1)} + Iu_k$$

(3) Measure the covariance $P_{(k|k-1)}$ at time k by the covariance $P_{(k-1|k-1)}$ between the observed value and the predicted value of the IGBT power module junction temperature at time (k−1):

$$P_{(k|k-1)} = FP_{(k-1|k-1)}F^T + Q$$

(4) Calculate the Kalman filter gain:

$$K_{(k)} = P_{(k|k-1)}H^T[HP_{(k|k-1)}^{-1}H^T + R]^{-1}$$

Specifically, $K_{(k)}$ represents the Kalman filter gain.

(5) Calculate the optimal estimated value of the system:

$$\hat{x}_{(k|k)} = \hat{x}_{(k|k-1)} + K_{(k)}(T_k - \hat{T}_{(k|k-1)})$$

Specifically, $\hat{x}_{(k|k)}$ represents the optimal estimated value of the thermal resistance of the IGBT power module at time k.

(6) Update the inverse operation of the optimal junction temperature value of the IGBT power module in the next step at time (k+1), that is, update the covariance:

$$P_{(k|k)} = [I - K_{(k)}H]P_{(k|k-1)}$$

Specifically, $P_{(k|k)}$ represents the updated covariance after time k, and I represents the unity matrix.

(7) Return to step (1) from step (6), performing a loop until the final result achieves the desired effect.

Compared with the existing art, the advantageous effects of the present invention are:

1. The method for estimating the junction temperature on the IGBT power module provided by the present invention is implemented on a full-bridge inverter, and is simulated by the system simulation software Saber, so that the actual working condition of the IGBT can be better simulated. Further, the conduction voltage drop $V_{CE(ON)}$ is utilized as the temperature sensitive electrical parameter to obtain the junction temperature. The $V_{CE(ON)}$ on-line measuring circuit is designed, which improves the measurement accuracy and achieves electrical insulation, so that the control strategy of changing the power converter is not required to make measurements. The IGBT self-heating is utilized and the coupling heat of the diode is considered, the state space representation method of the thermal model is developed by measuring the thermal impedance of the junction to the environment to derive the Kalman filter.

2. The present invention applies a Kalman filter to estimate the obtained junction temperature $T_j$, and constrains the measurement signal to the thermal model by means of a predictive-corrective rewinding loop, thereby reducing noise and eliminating the intermittent effect of the measurement of $V_{CE(ON)}$.

3. The method of the present invention can form a part of a real-time health management or active control system for a power converter and can be easily integrated into existing power converter control elements.

DESCRIPTION OF THE EMBODIMENTS

The present invention will be further described below with reference to specific embodiments and the accompanying drawings.

Figure 1:
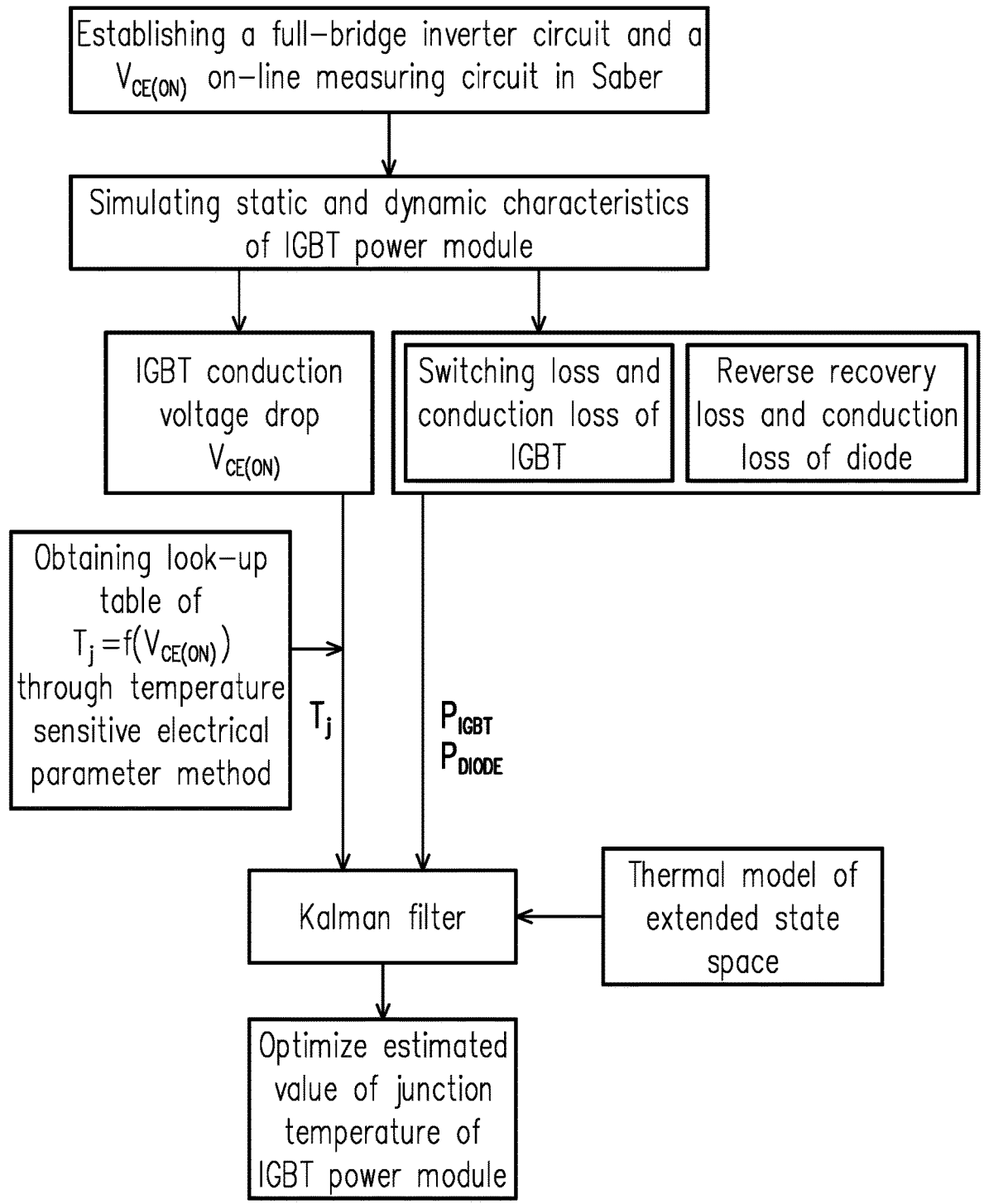
FIG. 1 is a flow chart of a method for estimating junction temperature on-line on an IGBT power module according to the present invention.
Figure 2:
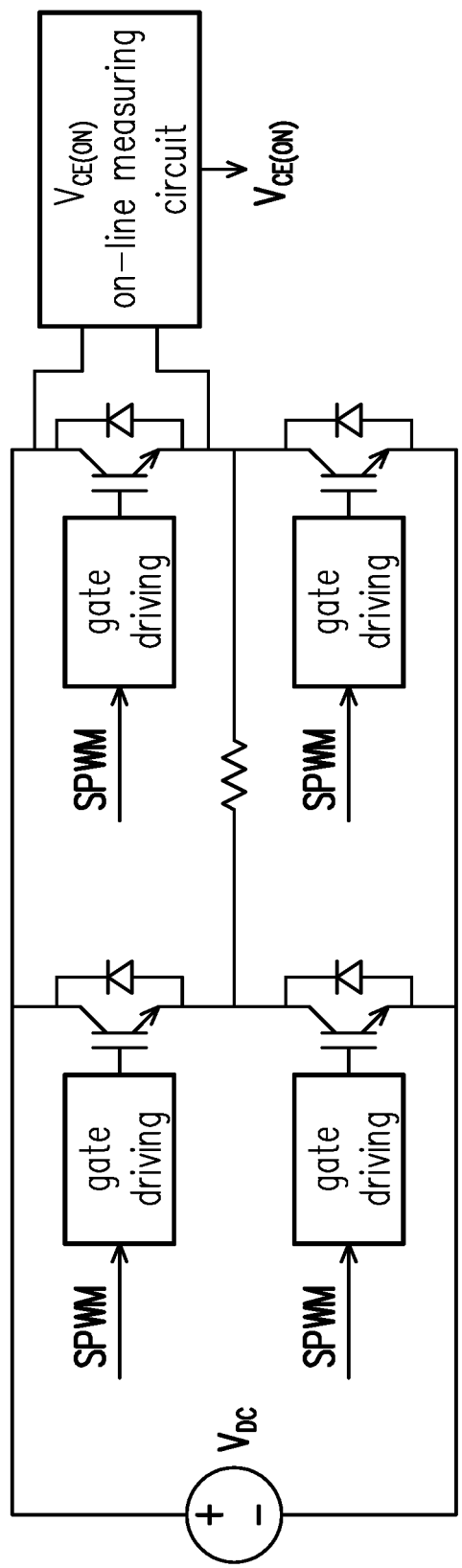
FIG. 2 is a circuit diagram of a full-bridge inverter.
Figure 3:
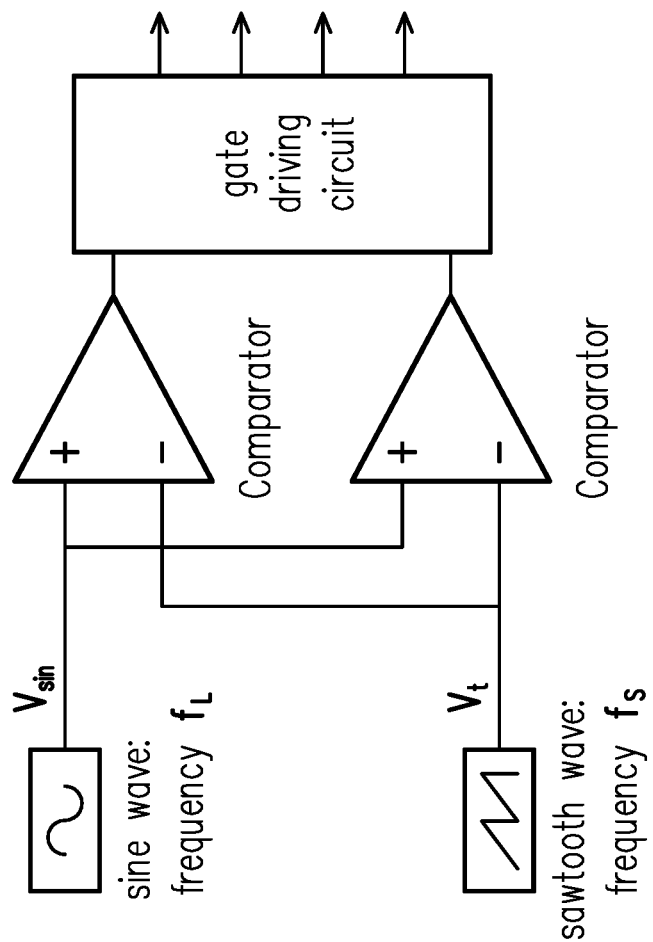
FIG. 3 is a schematic diagram showing principle of the SPWM control strategy.

As shown in FIG. 1, the present invention provides a method for estimating the junction temperature on-line on an IGBT power module. The implementation process of the method is described in detail below by taking the full-bridge inverter circuit shown in FIG. 3 as an example. The specific implementation steps are as follows:

Step 1. Set up a full-bridge inverter circuit, a $V_{CE(ON)}$ on-line measuring circuit, a SPWM control circuit and a gate driving circuit in Saber, and connect the two input terminals of the $V_{CE(ON)}$ on-line measuring circuit to the collector and emitter of an IGBT of the full-bridge inverter, thereby implementing the connection of the full-bridge inverter circuit to the $V_{CE(ON)}$ on-line measuring circuit, as shown in FIG. 2.

Specifically, step 1 in the embodiment includes the following process:

1-1. Referring to the schematic diagram showing the principle of the sinusoidal pulse width modulation shown in FIG. 3, the most common strategy for controlling the power transmitted to the load is pulse width modulation (PWM), and one method of generating the PWM signal is to compare the sine wave $v_{sin}$ having a frequency of $f_L$ with the sawtooth wave $v_t$ having a switching frequency of $f_s$, and then the gate driving circuit switch is controlled according to $v_{sin}$ and $v_t$. The gate driving circuit is modulated by the SPWM control circuit, and the input terminal of the gate driving circuit is connected to the output terminal of the SPWM control circuit. The output terminal of the gate driving circuit is connected to the gate of the IGBT of the IGBT power module. The full-bridge inverter circuit has four bridge arms, and each of the bridge arms is composed of an SPWM control circuit, a gate driving circuit, an IGBT and a diode. Then the $V_{CE(ON)}$ on-line measuring circuit is set, and finally the two input terminals of the $V_{CE(ON)}$ on-line measuring circuit are connected to the collector and emitter of the IGBT of one of the bridge arms of the full-bridge inverter circuit. In order to prevent that the two IGBTs in the upper and lower bridge arms of the full-bridge inverter are simultaneously turned on due to the switching speed problem of the gate driving circuit, it is required to set a reasonable dead-zone time.

Figure 4:
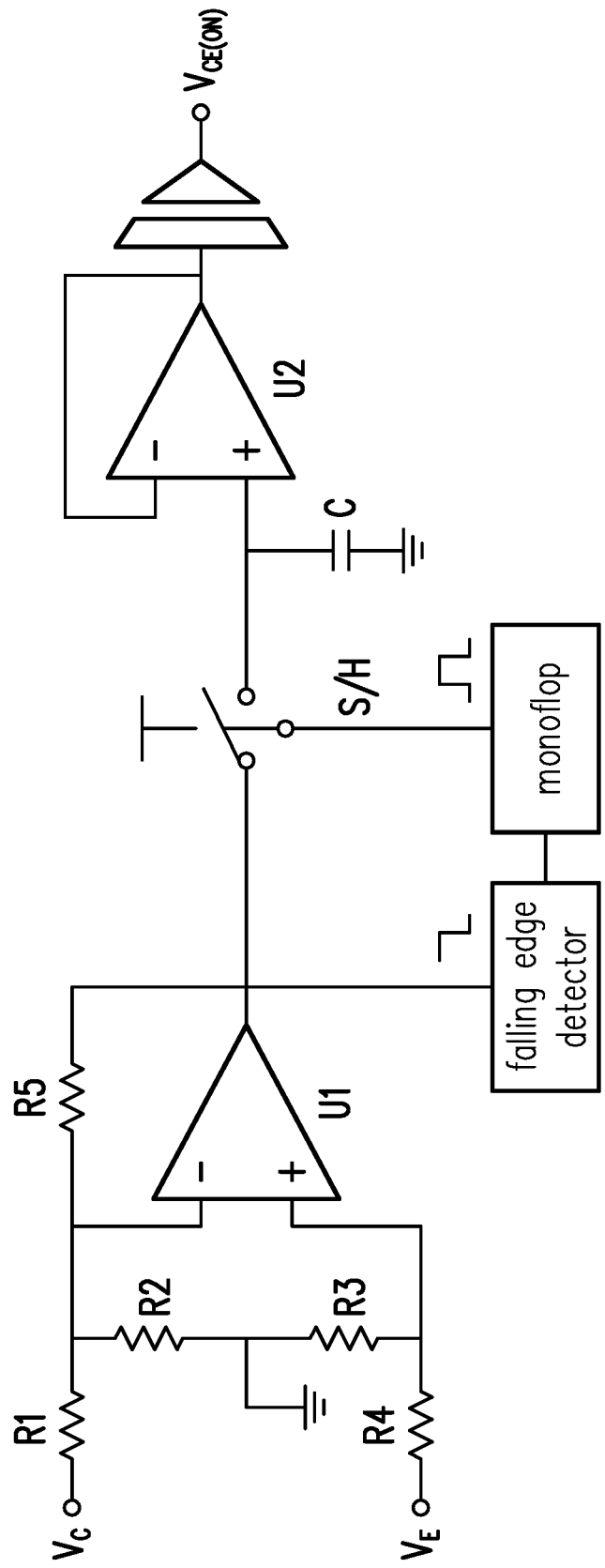
FIG. 4 shows the $V_{CE(ON)}$ on-line measuring circuit.

1-2. Referring to the $V_{CE(ON)}$ on-line measuring circuit shown in FIG. 4, the two input terminals of the $V_{CE(ON)}$ on-line measuring circuit are respectively connected to the collector and emitter of the IGBT, and the resistor $R_1$, $R_2$ and $R_3$, $R_4$ in the $V_{CE(ON)}$ on-line measuring circuit are proportionally divided to reach the input voltage range of the operational amplifier U1; the output terminal of U1 is connected to a falling edge detector, and the output voltage of U1 is compared with a set voltage to detect the falling edge of the IGBT collector-emitter voltage $V_{CE}$, and the monoflop is triggered so that the monoflop changes from steady state to transient state. The delay time of the monoflop is set as 100 µs, when the monoflop is recovered from the temporary steady state to the steady state, the monoflop triggers sampling. The sampling signal is modulated through the high frequency signal and transmitted through the isolation barrier (capacitor C in FIG. 4), and then demodulated at the output terminal of the operational amplifier U2 in FIG. 5, thereby recovering the sampling signal. A 16-bit analog-to-digital converter (ADC) with a range of ±5V is utilized to obtain the IGBT conduction voltage drop $V_{CE(ON)}$ value on the measurement side (i.e., the output terminal of the $V_{CE(ON)}$ on-line measuring circuit).

Figure 5:
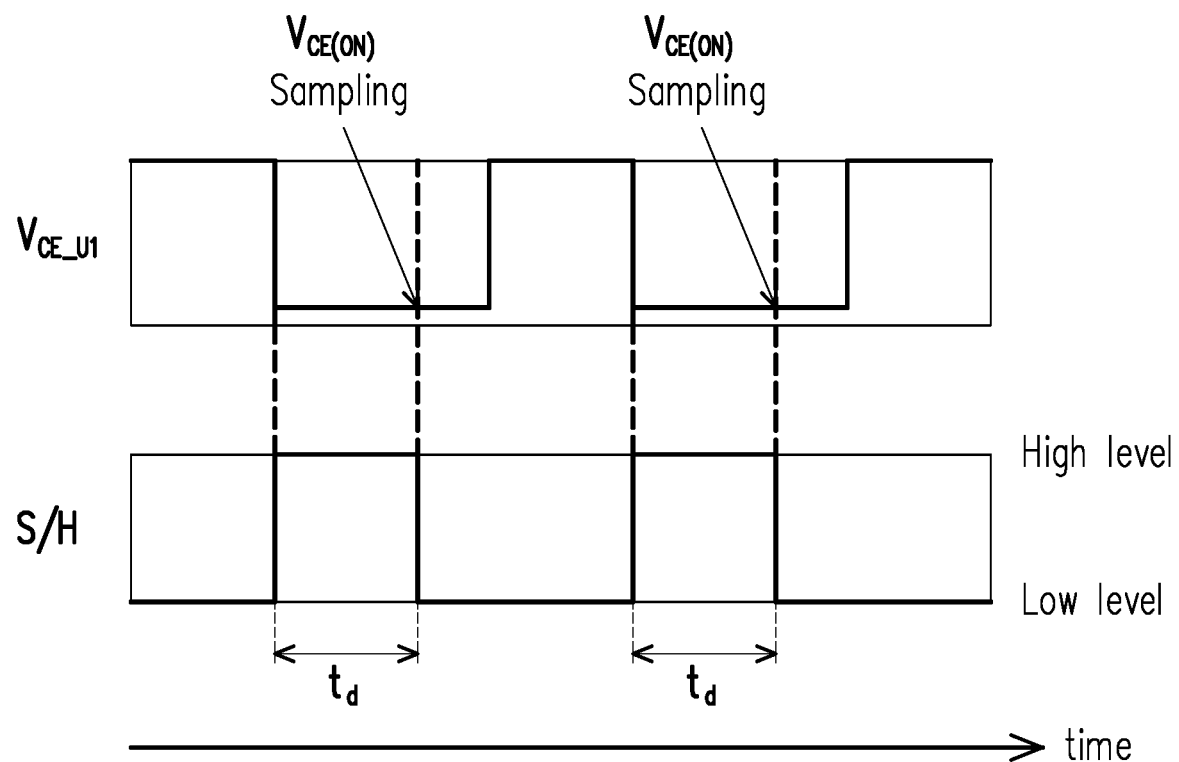
FIG. 5 is a schematic diagram of the operating signals of the $V_{CE(ON)}$ on-line measuring circuit.

1-3, FIG. 5 shows the operating signal of the $V_{CE(ON)}$ on-line measuring circuit, wherein $V_{CE\_U1}$ represents the output voltage of the operational amplifier U1; S/H represents the sampling and retaining signal used to obtain the IGBT conduction voltage drop $V_{CE(ON)}$ value; $t_d$ is the delay time of the monoflop.

Step 2: Obtain the IGBT conduction voltage drop $V_{CE(ON)}$ for the connected full-bridge inverter circuit and the $V_{CE(ON)}$ on-line measuring circuit, and obtain the calibration curve and fitting relationship of IGBT conduction voltage drop $V_{CE(ON)}$ and IGBT power module junction temperature $T_j$ by using the temperature sensitive electrical parameter method. Firstly, the IGBT is placed in the incubator, and the small current $I_C$ (100 mA-1 A) is injected into the collector of the IGBT after the junction temperature of the IGBT power module is stabilized. Then, the saturation conduction voltage drop $V_{CE(ON)}$ of the IGBT is measured, and the temperature of the incubator is changed, the saturation conduction voltage drop $V_{CE(ON)}$ of the IGBT is repeatedly measured in the range of 20° C.-150° C. Finally the junction temperature $T_j$ serves as the dependent variable, $V_{CE(ON)}$ serves as the independent variable, and the $V_{CE(ON)}$ is linearly fitted to obtain the fitting relationship $T_j = f(V_{CE(ON)})$.

Step 3. Set up a full-bridge inverter model in Saber, set a behavior model of an IGBT power module composed of an IGBT and a corresponding diode, simulate and analyze its static and dynamic characteristics of the behavior model, and calculate the switch loss and conduction loss of the IGBT as well as reverse recovery loss and conduction loss of the diode.

The IGBT Level-1 Tool modeling toolbox in Saber is utilized to set the simulation model for the specific structure and process of the device, thereby accurately representing the static and dynamic characteristics of the device, simulating the dynamic switching process of the IGBT power module, and obtaining the voltage and current waveform of the IGBT when the IGBT is on and off, and reverse recovery voltage and current waveform of diode, and voltage and current waveforms when IGBT and diode are turned on.

The loss of the IGBT is calculated as follows:

$$P_{on} = \frac{1}{t_{on}} \int_0^{t_{on}} v_{ce}(t) i_c(t) dt$$

$$P_{off} = \frac{1}{t_{off}} \int_0^{t_{off}} v_{ce}(t) i_c(t) dt$$

$$P_{cond\_I} = V_{ce(on)} \times I_C \times \delta_I$$

$$P_{IGBT} = P_{on} + P_{off} + P_{cond}$$

In the above equations, $P_{on}$ represents the turn-on loss of the IGBT; $t_{on}$ represents the turn-on time of the IGBT; $v_{ce}(t)$ represents the collector-emitter voltage of the IGBT during turn-on; $i_c(t)$ represents the collector current of the IGBT during turn-on; $P_{off}$ represents the IGBT turn-off loss; $t_{off}$ indicates the turn-off time of the IGBT; $P_{cond\_I}$ indicates the conduction loss of the IGBT; $V_{ce(on)}$ indicates the conduction voltage drop of the IGBT; $I_C$ indicates the conduction current of the IGBT; and $\delta_1$ indicates the duty ratio of the current operating state of the IGBT; $P_{IGBT}$ represents the total loss of the IGBT; t represents time.

The loss of the diode is calculated as follows:

$$P_{cond\_D} = V_F \times I_F \times \delta_D$$

$$P_{rec} = \frac{1}{t_{rr}} \int_0^{t_{rr}} v_f(t) i_f(t) dt$$

$$P_{DIODE} = P_{cond\_D} + P_{rec}$$

In the above equations, $P_{cond\_D}$ represents the conduction loss of the diode; $V_F$ represents the conduction voltage drop of the diode; $I_F$ represents the conduction current of the diode; $\delta_D$ represents the duty ratio of the current operating state of the diode; $P_{rec}$ represents the reverse recovery loss of the diode; t represents the reverse recovery time of the diode; $v_f(t)$ represents the voltage of the diode in reverse recovery; and $i_f(t)$ represents the current when the diode is in reverse recovery; t represents time.

Step 4. Consider the coupling effect between the IGBT and the diode in the IGBT power module of step 3, and set a space thermal model of extended state of the IGBT power module.

Figure 6:
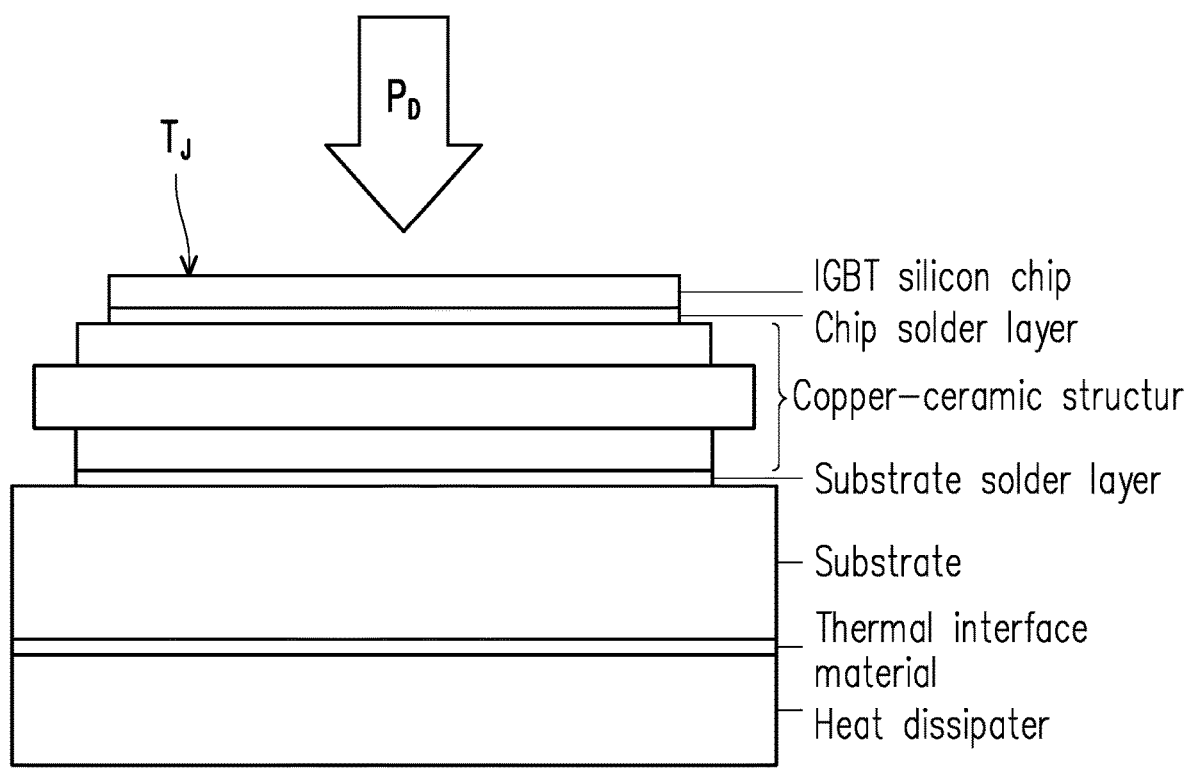
FIG. 6 is a multi-layer structure diagram of an IGBT power module.

FIG. 6 shows a multilayer structure of IGBTs made up of different materials, with power transmitted from the top to the bottom. The thermal resistance is regarded as a step response of the junction temperature to the input power. The equation is as follows:

$$Z_{\theta ja}(t) = (T_j(t) - T_a)/P_{IGBT}$$

In the equation, $T_j(t)$ represents the IGBT junction temperature; $T_a$ represents the ambient temperature at which the IGBT power module is located; $Z_{\theta ja}(t)$ represents the IGBT thermal resistance; $P_{IGBT}$ represents the total loss of the IGBT; t represents time.

Figure 7:
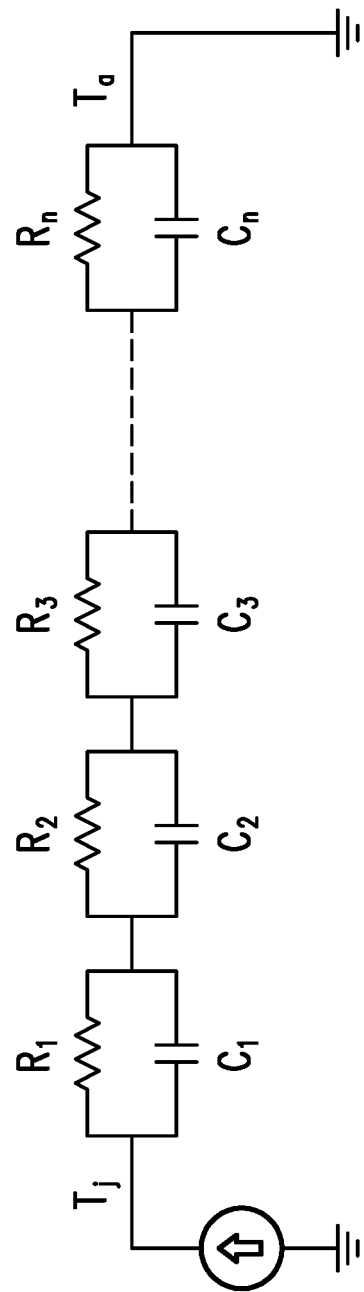
FIG. 7 is a diagram of an electrically equivalent Foster thermal network model.

FIG. 7 shows the Foster thermal network model, which uses a series of RC components to characterize the thermal resistance. The time response can be expressed as:

$$Z_{\theta ja}(t) = \Sigma_{i=1}^n R_i (1 - e^{-t/R_i C_i})$$

The Laplace transform is performed on the above equation, and the thermal resistance in the frequency domain is expressed as a partial fractional form:

$$Z_{\theta ja}(s) = \frac{k_1}{s + p_1} + \frac{k_2}{s + p_2} + \ldots + \frac{k_n}{s + p_n}$$

In the above two equations, i represents the network order of the Foster thermal network model; n represents the total network order of the Foster thermal network model; $R_i$ represents the thermal resistance in the Foster thermal network model; $C_i$ represents the thermal capacitances in the Foster thermal network model; t represents time; $k_i = 1/C_i$; $k_n = 1/C_n$; $p_i = 1/R_i C_i$, $p_n = 1/R_n C_n$.

The state space expression for the partial fraction of the above partial fractional form is:

$$\dot{x}(t) = Ax(t) + Bu(t) \text{ (equation of state)}$$

$$T_j(t) = Cx(t) + Du(t) \text{ (output equation)}$$

$$A = \begin{bmatrix} \frac{1}{R_1 C_1} & 0 & 0 & \ldots & 0 \\ 0 & \frac{1}{R_2 C_2} & 0 & \ldots & 0 \\ 0 & 0 & \frac{1}{R_3 C_3} & \ldots & 0 \\ \vdots & \vdots & \vdots & \ddots & \vdots \\ 0 & 0 & 0 & \ldots & \frac{1}{R_n C_n} \end{bmatrix},$$

$$b = \begin{bmatrix} \frac{1}{C_1} & 0 \\ \frac{1}{C_2} & 0 \\ \frac{1}{C_3} & 0 \\ \vdots & \vdots \\ \frac{1}{C_n} & 0 \end{bmatrix}$$

$$C = [1 \ 1 \ 1 \ \ldots \ 1],$$

$$D = [0 \ 1]$$

Specifically, x(t) represents an n-dimensional state vector; t represents time; $A_{n \times n}$ represents a system matrix of n rows and n columns; $B_{n \times 2}$ represents an input matrix of n rows and 2 columns; $C_{1 \times n}$ represents the output matrix of 1 row and n columns; $D_{1 \times 2}$ represents the feedforward matrix of 1 row and 2 columns. In addition, $$u(t) = \begin{bmatrix} P_D(T) \\ T_a \end{bmatrix}$$

represents the system input vector, wherein $P_D(t)$ represents power loss of the IGBT power module.

Consider the coupling effect of the diode, and the above state space model is extended as follows:

$$\begin{bmatrix} x_{s1}' \\ \vdots \\ x_{sn}' \\ x_{c1}' \\ \vdots \\ x_{cn}' \end{bmatrix} = \begin{bmatrix} p_{s1} & 0 & 0 & 0 & \cdots & 0 \\ 0 & \ddots & 0 & \vdots & \cdots & 0 \\ \vdots & 0 & p_{sn} & 0 & \vdots & 0 \\ 0 & \vdots & 0 & p_{c1} & 0 & \vdots \\ 0 & \cdots & \vdots & 0 & \ddots & 0 \\ 0 & \cdots & 0 & 0 & \cdots & p_{cn} \end{bmatrix} \begin{bmatrix} x_{s1} \\ \vdots \\ x_{sn} \\ x_{c1} \\ \vdots \\ x_{cn} \end{bmatrix} + \begin{bmatrix} k_{s1} & 0 & 0 \\ \vdots & \vdots & \vdots \\ k_{sn} & 0 & 0 \\ 0 & k_{c1} & 0 \\ \vdots & \vdots & \vdots \\ 0 & k_{cn} & 0 \end{bmatrix} \begin{bmatrix} P_{IGBT} \\ P_{DIODE} \\ T_a \end{bmatrix}$$

$$T_j = \begin{bmatrix} 1 & 1 & 1 & \cdots & 1 \end{bmatrix} \begin{bmatrix} x_{s1} \\ \vdots \\ x_{sn} \\ x_{c1} \\ \vdots \\ x_{cn} \end{bmatrix} + \begin{bmatrix} 0 & 0 & 1 \end{bmatrix} \begin{bmatrix} P_{IGBT} \\ P_{DIODE} \\ T_a \end{bmatrix}$$

Specifically, $x_{s1}, \ldots, x_{sn}$ represents the state of self-heating impedance, $x_{c1}, \ldots, x_{cn}$ represents the state of the coupling thermal impedance; $P_{IGBT}$ represents the power loss of the IGBT in the IGBT power module, $P_{DIODE}$ represents the power loss of the diode in the IGBT power module;

$$p_{s1} = \frac{1}{R_{s1}C_{s1}},$$

$$p_{sn} = \frac{1}{R_{sn}C_{sn}};$$

$$p_{c1} = \frac{1}{R_{c1}C_{c1}},$$

$$p_{sn} = \frac{1}{R_{sn}C_{sn}};$$

$$k_{s1} = \frac{1}{C_{sI}},$$

$$k_{sn} = \frac{1}{C_{sn}};$$

$$k_{c1} = \frac{1}{c_{cI}},$$

$$k_{cn} = \frac{1}{c_{cn}};$$

specifically, $R_{s1} \ldots R_{sn}$, $C_{s1} \ldots C_{sn}$ represent the thermal resistance thermal capacitances in the equivalent Foster thermal network model of the IGBT in the IGBT power module; $R_{c1} \ldots R_{cn}$, $C_{c1} \ldots C_{cn}$ represent the thermal resistance thermal capacitances in the equivalent Foster thermal network model of the diode in the IGBT power module.

Step 5. Set a system model of the Kalman filter (i.e., the Kalman filter):

A system of a discrete control process is introduced based on a space thermal model of the extended state in step 4 as follows:

$$x_k = Fx_{k-1} + Gu_k + w_k$$

$$T_k = Hx_k + Ju_k + v_k$$

In the above equation, k represents the time step; $x_{k-1}$ represents the state variable at time (k−1) (i.e., the thermal resistance of the IGBT power module); $x_k$ represents the state variable at time k (i.e., the thermal resistance of the IGBT power module); F and G respectively represent the system matrix and control matrix; $u_k$ represents the system input vector (the IGBT power module loss and the ambient temperature of the IGBT power module); $w_k$ and $v_k$ respectively represent the process noise and measurement noise. Assume that both are Gaussian white noise, the covariance of which are Q and R respectively; $T_k$ represents the junction temperature observation value of IGBT power module at time k; H and J respectively represent the observation matrix and direct matrix.

Figure 8:
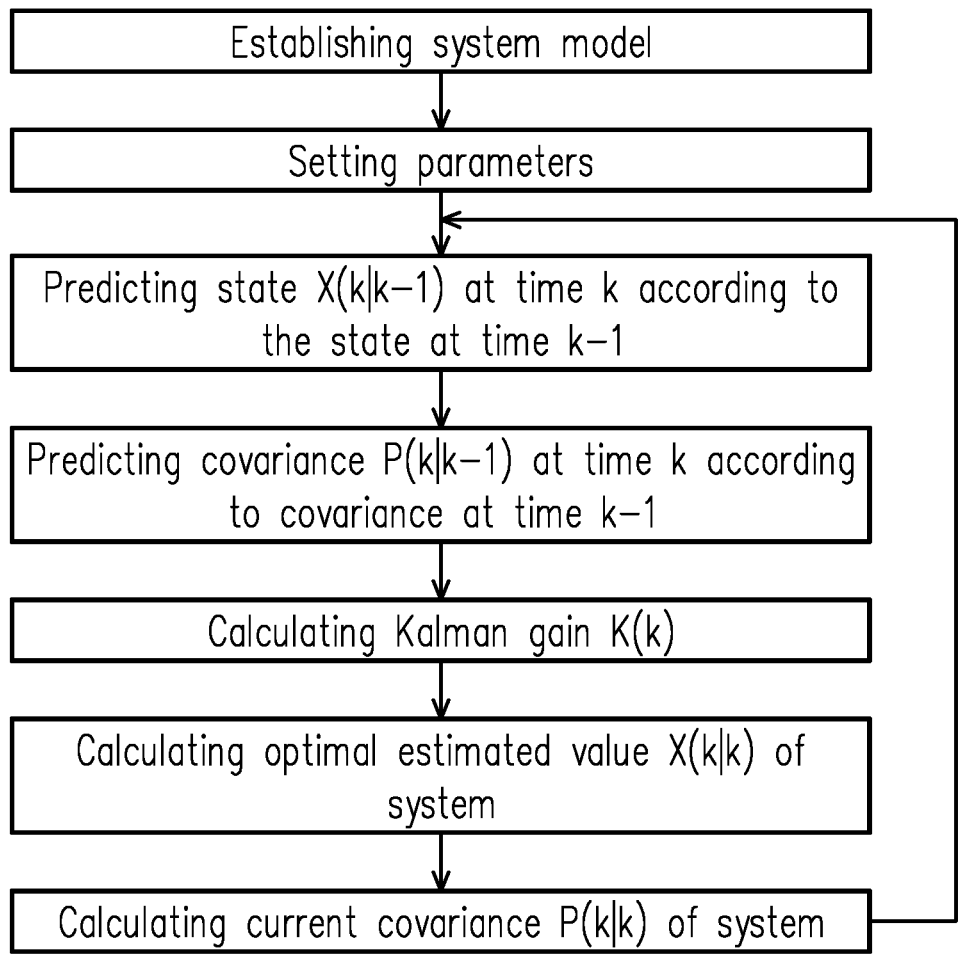
FIG. 8 is a flow chart of the Kalman filter algorithm.

As shown in FIG. 8, the Kalman filtering algorithm flow is described as follows:

(1) Predict the thermal resistance value $\hat{x}_{(k|k-1)}$ of IGBT power module at time k from the optimal thermal resistance estimated value $\hat{x}_{(k-1|k-1)}$ of the IGBT power module at time (k−1):

$$\hat{x}_{(k|k-1)} = F\hat{x}_{(k-1|k-1)} + Gu_k$$

(2) Calculate the predicted value of the junction temperature of the IGBT power module at time k:

$$\hat{T}_{(k|k-1)} = H\hat{x}_{(k|k-1)} + Ju_k$$

(3) Measure the covariance $P_{(k|k-1)}$ at time k by the covariance $P_{(k-1|k-1)}$ between the observed value and the predicted value of the IGBT power module junction temperature at time (k−1):

$$P_{(k|k-1)} = FP_{(k-1|k-1)}F^T + Q$$

(4) Calculate the Kalman filter gain:

$$K_{(k)} = P_{(k|k-1)}H^T[HP_{(k|k-1)}^{-1}H^T + R]^{-1}$$

Specifically, $K_{(k)}$ represents the Kalman filter gain.

(5) Calculate the optimal estimated value of the system:

$$\hat{x}_{(k|k)} = \hat{x}_{(k|k-1)} + K_{(k)}(T_k - \hat{T}_{(k|k-1)})$$

Specifically, $\hat{x}_{(k|k)}$ represents the optimal estimated value of the thermal resistance of the IGBT power module at time k.

(6) Update the inverse operation of the optimal junction temperature value of the IGBT power module in the next step at time (k+1), that is, update the covariance:

$$P_{(k|k)} = [I - K_{(k)}H]P_{(k|k-1)}$$

Specifically, $P_{(k|k)}$ represents the updated covariance after time k, and I represents the unity matrix.

Return to step (1) from step (6), perform a loop until the final result achieves the desired effect.

Table 1 compares the statistical error of estimated value of the junction temperature $T_j$ before and after the application of the Kalman filter, which fully demonstrates the superiority of the present invention.

Table 1 statistical error of estimated value of the junction temperature $T_j$ before and after the application of the Kalman filter

|  | Average absolute error | Standard deviation |
| --- | --- | --- |
| Before application | 1.42 | 2.05 |
| After application | 0.76 | 0.61 |

The equation for calculating the average absolute error is as follows:

$$MAE = \frac{1}{N}\sum_{t=1}^{N}|x_t - y_t|$$

The equation for calculating the standard deviation is as follows:

$$\sigma = \sqrt{\frac{1}{N}\sum_{t=1}^{N}(x_t - \mu)^2}$$

In the above two equations, MAE represents the average absolute error; a represents the standard deviation; t represents the serial number of each estimated value of junction temperature; N represents the total number of estimated values of junction temperature; $x_t$ represents each estimated value of junction temperature; and $y_t$ represents each junction temperature value obtained through measurement by the infrared thermal imager; μ represents the average of N estimated values of junction temperature.

It is apparent that the above-described embodiments are merely illustrative of the invention and are not intended to limit the embodiments of the invention. Other variations or modifications of the various forms may be made by those skilled in the art in light of the above description. Obvious changes or variations that come within the spirit of the invention are still within the scope of the invention.

What is claimed is:

1. A method for estimating junction temperature on-line on an insulated gate bipolar transistor (IGBT) power module, comprising the following steps executing by a processor:

step 1: performing a control strategy of the IGBT power module and setting up a full-bridge inverter circuit and a $V_{CE(ON)}$ on-line measuring circuit based on a power electronic simulation software Saber, connecting two input terminals of the $V_{CE(ON)}$ on-line measuring circuit to a collector and an emitter of an IGBT of the full-bridge inverter circuit, thereby realizing connection between the full-bridge inverter circuit and the $V_{CE(ON)}$ on-line measuring circuit;

step 2: obtaining IGBT conduction voltage drop $V_{CE(ON)}$ for the connected full-bridge inverter circuit and the $V_{CE(ON)}$ on-line measuring circuit, using a temperature sensitive electrical parameter method to obtain a calibration curve and a fitting relationship of the IGBT conduction voltage drop $V_{CE(ON)}$ and an IGBT power module junction temperature $T_j$;

step 3: based on the full-bridge inverter circuit set in step 1, setting a behavior model of the IGBT power module composed of an IGBT and a corresponding diode, wherein static and dynamic characteristics of the behavior model are simulated and analyzed to calculate switching loss and conduction loss of the IGBT, reverse recovery loss and conduction loss of the diode;

step 4: considering a coupling effect between the IGBT and the diode in the IGBT power module of step 3, and setting a thermal model of an extended state space of the IGBT power module;

step 5: setting a system model of the Kalman filter, the IGBT power module junction temperature obtained in the step 2, the switching loss and the conduction loss of the IGBT obtained in the step 3, the reverse recovery loss and the conduction loss of the diode obtained in the step 3 are used as filter inputs to calculate an optimal estimated value of the junction temperature;

step 6: employing a physical IGBT power module in a power supplying circuit; and step 7: modifying an operation of the physical IGBT power module based on the optimal estimated value of the junction temperature.

2. The method for estimating junction temperature on-line on the IGBT power module according to claim 1, wherein setting the full-bridge inverter circuit in the step 1 comprises following steps executing by the processor:

firstly setting a sinusoidal pulse width modulation (SPWM) control circuit, setting a dead-zone time, and then setting a gate driving circuit, wherein the gate driving circuit is modulated by the SPWM control circuit, an input terminal of the gate driving circuit is connected to an output terminal of the SPWM control circuit, and an output terminal of the gate driving circuit is connected to a gate of the IGBT of the IGBT power module; the full-bridge inverter circuit has four bridge arms, each of the bridge arms is composed of one SPWM control circuit, one gate driving circuit, one IGBT and one diode; then the $V_{CE(ON)}$ on-line measuring circuit is set, and finally the two input terminals of the $V_{CE(ON)}$ on-line measuring circuit are connected to the collector and emitter of the IGBT of one of the bridge arms of the full-bridge inverter circuit.

3. The method for estimating junction temperature on-line on the IGBT power module according to claim 1, wherein monitoring the junction temperature on-line by the temperature sensitive electrical parameter method comprises following steps executing by the processor:

first, placing the IGBT in an incubator, and after the junction temperature of the IGBT power module being stabilized, injecting a small current $I_C$ of 100 mA-1A into the collector of the IGBT;

then measuring a saturation conduction voltage drop $V_{CE(ON)}$ of IGBT, changing a temperature of the incubator and repeatedly measuring the saturation conduction voltage drop $V_{CE(ON)}$ of the IGBT in a range of 20° C.-150° C.; and finally taking the junction temperature $T_j$ as a dependent variable, and $V_{CE(ON)}$ as an independent variable, and linearly fitting the $V_{CE(ON)}$ to obtain a fitting relationship $T_j=f(v_{CE(ON)})$.

4. The method for estimating junction temperature on-line on the IGBT power module according to claim 1, wherein the switching loss and the conduction loss of the IGBT, the reverse recovery loss and the conduction loss of the diode obtained through the calculation in the step 3 comprise following steps executing by the processor:

using a IGBT Level-1 Tool modeling toolbox in Saber to set a simulation model for a specific structure and process of a device, thereby accurately representing the static and dynamic characteristics of the device, simulating a dynamic switching process of the IGBT power module, and obtaining a voltage and a current waveform of the IGBT when the IGBT is on and off, and a reverse recovery voltage and a current waveform of the diode, and a voltage and a current waveforms when the IGBT and the diode are turned on;

wherein the loss of the IGBT is calculated as follows:

$$P_{on} = \frac{1}{t_{on}} \int_0^{t_{on}} v_{ce}(r)i_c(t)dt$$

$$P_{off} = \frac{1}{t_{off}} \int_0^{t_{off}} v_{ce}(t)i_c(t)dt$$

$$P_{cond\_I} = V_{ce(on)} \times I_C \times \delta_1$$

$$P_{IGBT} = P_{on} + P_{off} + P_{cond}$$

wherein in the above equations, $P_{on}$ represents a turn-on loss of the IGBT; $t_{on}$ represents a turn-on time of the IGBT; $v_{ce}(t)$ represents a collector voltage of the IGBT during turn-on; $i_c(t)$ represents a collector current of the IGBT during turn-on; $P_{off}$ represents the IGBT turn-off loss; $t_{off}$ indicates a turn-off time of the IGBT; $P_{cond\_I}$ indicates a conduction loss of the IGBT; $V_{ce(on)}$ indicates a conduction voltage drop of the IGBT; $I_C$ indicates a conduction current of the IGBT; and $\delta_I$ indicates a duty ratio of a current operating state of the IGBT; $P_{IGBT}$ represents a total loss of the IGBT; t represents time;

wherein the loss of the diode is calculated as follows:

$$P_{cond\_D} = V_F \times I_F \times \delta_D$$

$$P_{rec} = \frac{1}{t_{rr}} \int_0^{t_{rr}} v_f(t)i_f(t)dt$$

$$P_{DIODE} = P_{cond\_D} + P_{rec}$$

wherein in the above equations, $P_{cond\_D}$ represents a conduction loss of the diode; $V_F$ represents a conduction voltage drop of the diode; $I_F$ represents a conduction current of the diode; $\delta_D$ represents a duty ratio of a current operating state of the diode; $P_{rec}$ represents a reverse recovery loss of the diode; $t_{rr}$ represents a reverse recovery time of the diode; $v_f(t)$ represents a voltage of the diode in reverse recovery; and $i_f(t)$ represents current when the diode is in reverse recovery; t represents time.

5. The method for estimating junction temperature on-line on the IGBT power module according to claim 1, wherein setting the space thermal model of the extended state of the IGBT power module in the step 4 comprises following steps executing by the processor:

first, simulating self-heating of the IGBT, and expressing its thermal resistance by the following equation:

$$Z_{\theta ja}(t) = (T_j(t) - T_a)/P_{IGBT}$$

wherein in the above equation, $T_j(t)$ represents an IGBT junction temperature; $T_a$ represents an ambient temperature at which the IGBT power module is located; $Z_{\theta ja}(t)$ represents a thermal resistance; $P_{IGBT}$ represents a total loss of the IGBT; t represents time;

wherein the above equation is expressed by an equivalent RC network, which is replaced by a Foster thermal network model, which is an RC loop composed of N thermal resistances and N thermal capacitances connected in parallel, a time response is expressed by the following series of exponential items:

$$Z_{\theta ja}(t) = \sum_{i=1}^{n} R_i\left(1 - e^{-t/R_iC_i}\right)$$

performing the Laplace transform on the above equation, wherein the thermal resistance in a frequency domain is expressed as a partial fractional form:

$$Z_{\theta ja}(s) = \frac{k_1}{s+p_1} + \frac{k_2}{s+p_2} + \ldots + \frac{k_n}{s+p_n}$$

wherein in the above two equations, i represents a network order of the Foster thermal network model; n represents a total network order of the Foster thermal network model; $R_i$ represents a thermal resistance in the Foster thermal network model; $C_i$ represents thermal capacitances in the Foster thermal network model; $k_i = 1/C_i$; $k_n = 1/C_n$; $p_i = 1/R_iC_i$; $p_n = 1/R_nC_n$;

wherein a state space expression for the partial fraction of the above partial fractional form is:

$$\dot{x}(t) = Ax(t) + Bu(t)$$

$$T_j(t) = Cx(t) + Du(t)$$

$$A = \begin{bmatrix} \frac{1}{R_1C_1} & 0 & 0 & \ldots & 0 \\ 0 & \frac{1}{R_2C_2} & 0 & \ldots & 0 \\ 0 & 0 & \frac{1}{R_3C_3} & \ldots & 0 \\ \vdots & \vdots & \vdots & \ddots & \vdots \\ 0 & 0 & 0 & \ldots & \frac{1}{R_nC_n} \end{bmatrix},$$

$$B = \begin{bmatrix} \frac{1}{C_1} & 0 \\ \frac{1}{C_2} & 0 \\ \frac{1}{C_3} & 0 \\ \vdots & \vdots \\ \frac{1}{C_n} & 0 \end{bmatrix}$$

$$C = [1\ 1\ 1\ \ldots\ 1],$$

$$D = [0\ 1]$$

wherein x(t) represents an n-dimensional state vector; $A_{n \times n}$ represents a system matrix of n rows and n columns, a diagonal matrix of which a main diagonal is $p_i$; $B_{n \times 2}$ represents an input matrix of n rows and 2 columns with a first column is $k_i$; $C_{1 \times n}$ represents an output matrix of 1 row and n columns; $D_{1 \times 2}$ represents a feedforward matrix of 1 row and 2 columns; in addition, $$u(t) = \begin{bmatrix} P_D(t) \\ T_a \end{bmatrix}$$

represents a system input vector, wherein $P_D(t)$ represents power loss of the IGBT power module;

wherein considering the coupling effect of the diode, and the above state space model is extended as follows:

$$\begin{bmatrix} x'_{s1} \\ \vdots \\ x'_{sn} \\ x'_{c1} \\ \vdots \\ x'_{cn} \end{bmatrix} = \begin{bmatrix} p_{s1} & 0 & 0 & 0 & \ldots & 0 \\ 0 & \ddots & 0 & \vdots & \ldots & 0 \\ \vdots & 0 & p_{sn} & 0 & \vdots & 0 \\ 0 & \vdots & 0 & p_{c1} & 0 & \vdots \\ 0 & \ldots & \vdots & 0 & \ddots & 0 \\ 0 & \ldots & 0 & 0 & \ldots & p_{cn} \end{bmatrix} \begin{bmatrix} x_{s1} \\ \vdots \\ x_{sn} \\ x_{c1} \\ \vdots \\ x_{cn} \end{bmatrix} + \begin{bmatrix} k_{s1} & 0 & 0 \\ \vdots & \vdots & \vdots \\ k_{sn} & 0 & 0 \\ 0 & k_{c1} & 0 \\ \vdots & \vdots & \vdots \\ 0 & k_{cn} & 0 \end{bmatrix} \begin{bmatrix} P_{IGBT} \\ P_{DIODE} \\ T_a \end{bmatrix}$$

$$T_j = [1\ 1\ 1\ \ldots\ 1]\begin{bmatrix} x_{s1} \\ \vdots \\ x_{sn} \\ x_{c1} \\ \vdots \\ x_{cn} \end{bmatrix} + [0\ 0\ 1]\begin{bmatrix} P_{IGBT} \\ P_{DIODE} \\ T_a \end{bmatrix}$$

wherein $x_{s1}, \ldots, x_{sn}$ represents a state of self-heating impedance, $x_{c1}, \ldots, x_{cn}$ represents a state of coupling thermal impedance; $P_{DIODE}$ represents a power loss of the IGBT in the IGBT power module, $P_{DIODE}$ represents a power loss of the diode in the IGBT power module;

$$p_{s1} = \frac{1}{R_{S1}C_{S1}},$$

$$p_{sn} = \frac{1}{R_{sn}C_{sn}};$$

$$p_{c1} = \frac{1}{R_{c1}C_{c1}},$$

$$p_{sn} = \frac{1}{R_{sn}C_{sn}};$$

$$k_{s1} = \frac{1}{C_{S1}},$$

$$k_{sn} = \frac{1}{C_{sn}};$$

$$k_{c1} = \frac{1}{C_{c1}},$$

$$k_{cn} = \frac{1}{C_{cn}};$$

specifically, $R_{s1} \ldots R_{sn}$, $C_{s1} \ldots C_{sn}$ represent thermal resistance thermal capacitances in the equivalent Foster thermal network model of the IGBT in the IGBT power module; $R_{c1} \ldots R_{cn}$, $C_{c1} \ldots C_{cn}$ represent thermal resistance thermal capacitances in the equivalent Foster thermal network model of the diode in the IGBT power module.

6. The method for estimating junction temperature on-line on the IGBT power module according to claim 1, wherein setting the system model of the Kalman filter in the step 5 comprises following steps executing by the processor:

introducing a system of a discrete control process based on the space thermal model of the extended state as follows:

$$x_k = Fx_{k-1} + Gu_k + w_k$$

$$T_k = Hx_k + Ju_k + v_k$$

wherein in the above equation, k represents a time step; $x_{k-1}$ represents a state variable, i.e., the thermal resistance of the IGBT power module, at time (k−1); $x_k$ represents the state variable, i.e., the thermal resistance of the IGBT power module, at time k; F and G respectively represent a system matrix and a control matrix; $u_k$ represents a system input vector, including a IGBT power module loss and an ambient temperature of the IGBT power module; $w_k$ and $v_k$ respectively represent process noise and measurement noise, and assuming that both are Gaussian white noise, a covariance of the process noise $w_k$ and the measurement noise $v_k$ are Q and R respectively; $T_k$ represents a junction temperature observation value of the IGBT power module at time k; H and J respectively represent an observation matrix and a direct matrix;

wherein a Kalman filtering algorithm flow is described as follows:

(1) predicting a thermal resistance value $\hat{x}_{(k|k-1)}$ of the IGBT power module at time k from an optimal thermal resistance estimated value $\hat{x}_{(k-1|k-1)}$ of the IGBT power module at time (k−1):

$$\hat{x}_{(k|k-1)} = F\hat{x}_{(k-1|k-1)} + Gu_k$$

(2) calculating the predicted value of the junction temperature of the IGBT power module at time k:

$$\hat{T}_{(k|k-1)} = H\hat{x}_{(k|k-1)} + Ju_k$$

(3) measuring the covariance $P_{(k|k-1)}$ at time k by the covariance $P_{(k-1|k-1)}$ between the observed value and the predicted value of the IGBT power module junction temperature at time (k−1):

$$P_{(k|k-1)} = FP_{(k-1|k-1)}F^T + Q$$

(4) calculating a Kalman filter gain:

$$K_{(k)} = P_{(k|k-1)}H^T[HP_{(k|k-1)}^{-1}H^T + R]^{-1}$$

wherein $K_{(k)}$ represents the Kalman filter gain;

(5) calculating an optimal estimated value of the system:

$$\hat{x}_{(k|k)} = \hat{x}_{(k|k-1)} + K_{(k)}(T_k - \hat{T}_{(k|k-1)})$$

wherein $\hat{x}_{(k|k)}$ represents an optimal estimated value of the thermal resistance of the IGBT power module at time k;

(6) updating an inverse operation of the optimal junction temperature value of the IGBT power module in the next step at time (k+1), which is updating the covariance:

$$P_{(k|k)} = [I - K_{(k)}H]P_{(k|k-1)}$$

wherein $P_{(k|k)}$ represents an updated covariance after time k, and I represents a unity matrix;

(7) returning to step (1) from step (6), performing a loop until a final result achieves a desired effect.

\* \* \* \* \*